United States Patent
Allen et al.

(10) Patent No.: US 7,000,192 B2
(45) Date of Patent: Feb. 14, 2006

(54) METHOD OF PRODUCING A MATTED IMAGE USABLE IN A SCRAPBOOK

(75) Inventors: Loretta E. Allen, Hilton, NY (US); Leanne M. Capozzi, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 579 days.

(21) Appl. No.: 09/961,651

(22) Filed: Sep. 24, 2001

(65) Prior Publication Data

US 2003/0058278 A1 Mar. 27, 2003

(51) Int. Cl.
G09G 5/00 (2006.01)
G06G 9/00 (2006.01)

(52) U.S. Cl. .................. 715/764; 715/730; 382/165
(58) Field of Classification Search ................ 345/591, 345/593–594, 597, 619, 764–765, 776, 788, 345/469.1; 715/528, 730, 765, 766
See application file for complete search history.

(56) References Cited

U.S. PATENT DOCUMENTS

| | | | |
|---|---|---|---|
| 4,772,941 A | 9/1988 | Noble | 358/76 |
| 5,027,197 A | 6/1991 | Endo | 358/76 |
| 5,138,366 A | 8/1992 | Maronian | 355/32 |
| 5,452,406 A | 9/1995 | Butler et al. | 395/126 |
| 5,815,645 A | 9/1998 | Fredlund et al. | 395/117 |
| 6,097,389 A * | 8/2000 | Morris et al. | 345/804 |
| 6,111,586 A * | 8/2000 | Ikeda et al. | 345/619 |
| 6,147,768 A * | 11/2000 | Norris | 358/1.18 |
| 6,331,858 B1 * | 12/2001 | Fisher | 345/582 |
| 6,587,596 B1 * | 7/2003 | Haeberli | 382/283 |
| 6,727,925 B1 * | 4/2004 | Bourdelais | 715/852 |
| 2002/0063901 A1 * | 5/2002 | Hicks | 358/302 |
| 2002/0186402 A1 * | 12/2002 | Jackson et al. | 358/1.15 |

* cited by examiner

*Primary Examiner*—Syd Luu
*Assistant Examiner*—Thanh Vu
(74) *Attorney, Agent, or Firm*—Susan L. Parulski; David A. Novais (57) ABSTRACT

A method of producing a matted image which is usable in a scrapbook. The method comprises the steps of displaying a digital image having a mat area; displaying a plurality of color selections from which a user can select at least one of the plurality of color selections; automatically applying the at least one selected color selection to the mat area to generate a colored mat; and displaying the matted image comprised of the digital image and the colored mat. In a preferred embodiment, the color selections are comprised of colors disposed in the digital image.

17 Claims, 12 Drawing Sheets

METHOD OF PRODUCING A MATTED IMAGE USABLE IN A SCRAPBOOK

FIELD OF THE INVENTION

The present invention relates generally to forming a scrapbook page or a portion of a scrapbook page which can be inserted into a scrapbook.

BACKGROUND OF THE INVENTION

A scrapbook is a collection of scrapbook pages, each of which is a unique collection of at least photographs, paper crafts, and journaling. In general, each scrapbook page or a group of pages are based on a theme, and all of the components that make up that page(s) are in context with the theme. For example, a scrapbook page having a "holiday" theme would comprise photographs taken during that particular holiday, and paper craft depicting the holiday, for instance, a valentine heart cut out of red construction paper or a purchased die cut. In addition, the person making the scrapbook page would record information about the holiday, including who was shown in the photographs on the page(s) in the form of journaling. All of the components of a scrapbook page are arranged in an aesthetically pleasing manner which best depicts the essence of the theme. The components are typically glued in place, and the assembled scrapbook page is inserted into a scrapbook album. A purpose of making a scrapbook page versus simply placing photographs in a standard photo album is to create a unique, personalized family heirloom which tells a story and will be cherished for a lifetime, and which will perhaps be passed on to a next generation. The task of creating a scrapbook page provides benefit to those participating in the craft as well as the recipient of the completed scrapbook album.

Novice scrapbookers often look to others for inspiration when organizing a new page layout. Experienced scrapbookers will share their scrapbook page layouts for creative inspiration, and because they are a source of pride for the creator. Scrapbook magazines show themed page layouts with a description on how to assemble a page, and the materials needed to get the desired results.

The scrapbook business has grown over the past several years. Today, there are scrapbook specialty stores, magazines devoted to the craft, and a plurality of websites offering on-line merchandise sales and creative tips. The type of merchandise available for this craft segment has grown substantially. Today, a person can purchase scrapbook specialty items including scissors to cut a variety of patterns, pre-printed patterned paper, paper in all colors of the rainbow, specialty pens, and specialty adhesives. However, on the other hand, the type of still photograph included in a scrapbook has gone relatively unchanged over 100 years.

With the advent of digital imaging, still photographs can take on a whole new look. Even if the original photograph was captured using an analog camera, the photograph can be scanned to create a digital copy of the original photograph. Once a photograph is in digital form, using digital editing techniques, a person can create distinctive looking composite images from the same or different photographs. The avid scrapbooker is continually looking for new ways to make an appealing scrapbook page layout, the latest technique to use, or a new product to try in their scrapbook. However, most of the present methods used by scrapbookers are fairly complex and use only a single image of the same scene.

Matting an image is one method of enhancing the image to make it appealing in a scrapbook. A mat is a border placed around an image to serve as a frame or contrast for the image. The mat typically surrounds the perimeter of the image. However, selecting a suitable color for the mat is not an easy task since a scrapbooker must first determine a collection of colors to consider; not an easy task if the image is comprised of a plurality of colors. Since a scrapbooker is interested in producing an aesthetically pleasing image which focuses on and promotes the subject of the image, selecting a color for the mat may be tedious and time consuming. Further, if multiple mats are desired, coordinating the colors of the mats with the image may be difficult. Still further, the cost of the mat may be expensive, particularly if the image is of a large or irregular size. Still further, any mat needs to have the archival properties and quality desired by a scrapbooker. For example, the mat may not be acid free, a characteristic desired by scrapbookers for long term archival.

Accordingly, there exists a need for a method of producing a matted image which is usable in a scrapbook. The method needs to be low cost, easy to use, accessible for the sporadic, intermittent use of scrapbookers, and produce a high quality, archival print. The method must provide immediate feedback to the scrapbooker as to how the matted image would be formed/produced. In addition, the method must be suitable for producing multiple mats on a single image.

SUMMARY OF THE INVENTION

An object of the present invention is to provide a method of constructing a matted image usable in a scrapbook.

Another object of the present invention is to construct such a matted image using an image provided by a user.

Still another object of the present invention is to provide a method of constructing such a matted image which is low cost, easy to use, and provides a high quality, archival print.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method of producing a matted image which is usable in a scrapbook. The method comprises the steps of displaying a digital image having a mat area; displaying a plurality of color selections from which a user can select at least one of the plurality of color selections; automatically applying the at least one selected color selection to the mat area to generate a colored mat; and displaying the matted image comprised of the digital image and the colored mat.

According to another aspect of the present invention, there is provided a method of producing a matted image which is usable in a scrapbook. The method comprises the steps of displaying a digital image having a mat area bordering the digital image; displaying in an area adjacent the digital image, a color selection area comprised of a plurality of color selections from which a user can select at least one of the plurality of color selections; automatically applying one color selection selected by the user to the mat area to produce the matted image comprised of the digital image and the colored mat; and displaying the matted image.

According to further aspect of the present invention, there is provided a method of producing a matted image which is usable in a scrapbook. The method comprises the steps of displaying a digital image having a mat area bordering the digital image; analyzing the digital image to determine a plurality of colors disposed in the digital image; displaying in an area adjacent the digital image, a color selection area comprising the plurality of colors disposed in the digital image from which a user can select at least one of the plurality of colors; automatically applying one color selected by the user to the mat area to produce the matted image comprised of the digital image and the colored mat; displaying the matted image; and storing, transferring, or printing the matted image.

According to yet another aspect of the present invention, there is provided a method of producing a matted image which is usable in a scrapbook. The method comprises the steps of (a) displaying in a display area, a digital image having a plurality of mat areas, each mat area disposed as a border of the digital image; (b) displaying in the display area, a plurality of color selections from which a user can select at least one of the plurality of color selections; (c) automatically applying the at least one selected color selection to one of the plurality of mat areas to generate a colored mat; (d) displaying the matted image comprised of the digital image and the colored mat; and (e) repeating steps (c) through (d) for each of the plurality of mat areas.

According to still another aspect of the present invention, there is provided a matted image which is usable in a scrapbook produced by the each of the methods disclosed above.

The present invention provides a method for producing a matted image which is usable in a scrapbook or can be fixed to a scrapbook page. The present invention provides a simple, low cost method, which permits a scrapbooker to construct a matted visual image derived from a scrapbooker-provided image which can be printed on a high quality, archival medium.

It is an advantage of the present invention that scrapbookers can provide at least one image and receive a matted image, and the matted image can be fixed to a page to provide an aesthetically pleasing scrapbook page.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
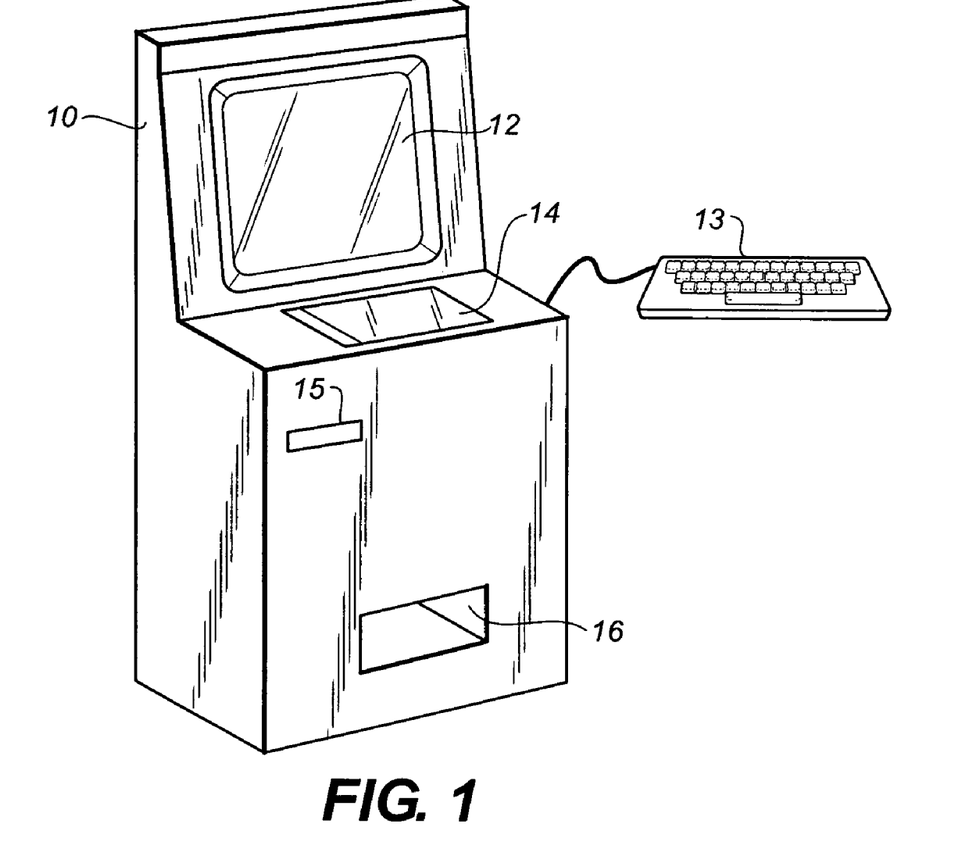
FIG. 1 shows an image producing device in accordance with the present invention.

The present invention employs an image making apparatus or image producing device 10. An example of an image producing device 10 is a Picture Maker™ kiosk produced by Eastman Kodak Company. Image producing device 10 is generally illustrated in FIG. 1. Image producing device 10 includes a color display 12 for presenting information to a user/scrapbooker. Color display 12 can be a touchscreen display, whereby a user can provide information and data to image producing device 10, or a keyboard 13 may be used to provide information and data. A scanner 14 may be provided for receiving a user-supplied visual image and converting the visual image into digital form. Alternatively, an input port 15 may be provided for receiving the user-supplied visual image in digital form, such as from a memory card, floppy disk, compact disc, or PictureCD. Image producing device 10 further includes a delivery section 16 for controlling the delivery of a medium. Delivery section 16 is illustrated in FIG. 1 as an opening in image producing device 10.

Figure 2:
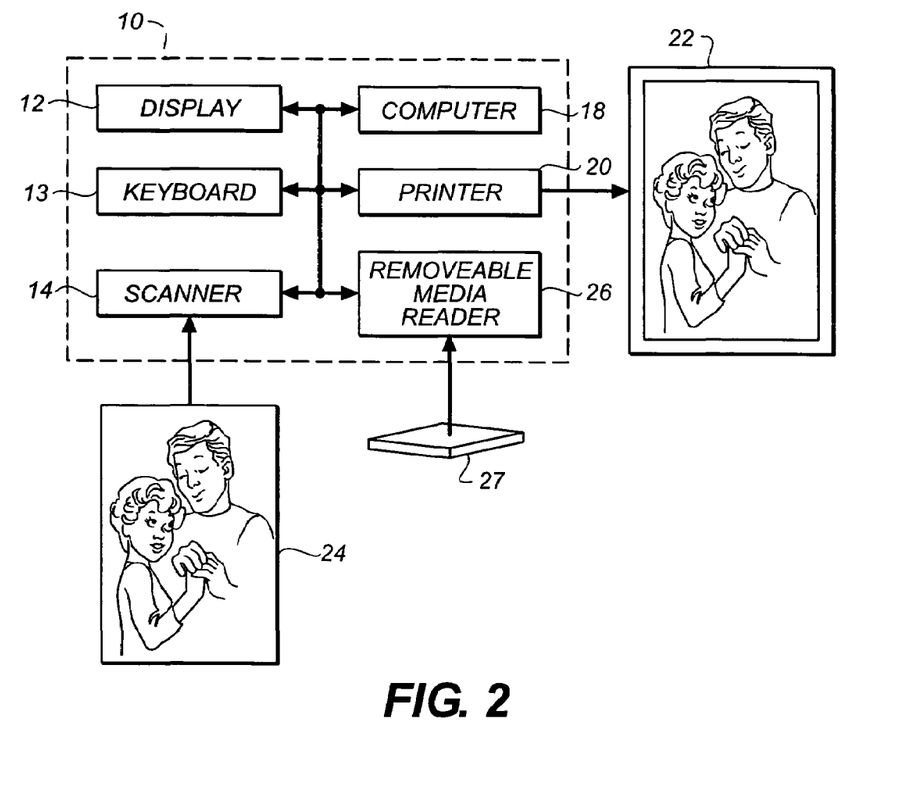
FIG. 2 generally shows a diagram of included functions of the image producing device of FIG. 1.

FIG. 2 generally shows a diagram of included functions of image producing device 10. As illustrated, image producing device 10 includes keyboard 13 for entering information/data into a computer 18. Computer 18 typically manages the flow of information and functionality of the components of image producing device 10. Internal to image producing device 10 is a printer 20, an example of which is the Kodak Digital Science Model 8650 manufactured by Eastman Kodak Company. Printer 20 responds to commands of computer 18 for forming a matted image on a medium such as thermal or ink-jet paper. An example of a matted image is illustrated in FIG. 2 at 22 which was formed from a user-supplied visual image 24. As described above, another method of receiving user-supplied visual image 24 is illustrated by a removable media reader 26 for receiving removable media 27, for example, a memory card, floppy disk, compact disc, PictureCD, or other form of removable media used in transferring digital files.

Figure 3:
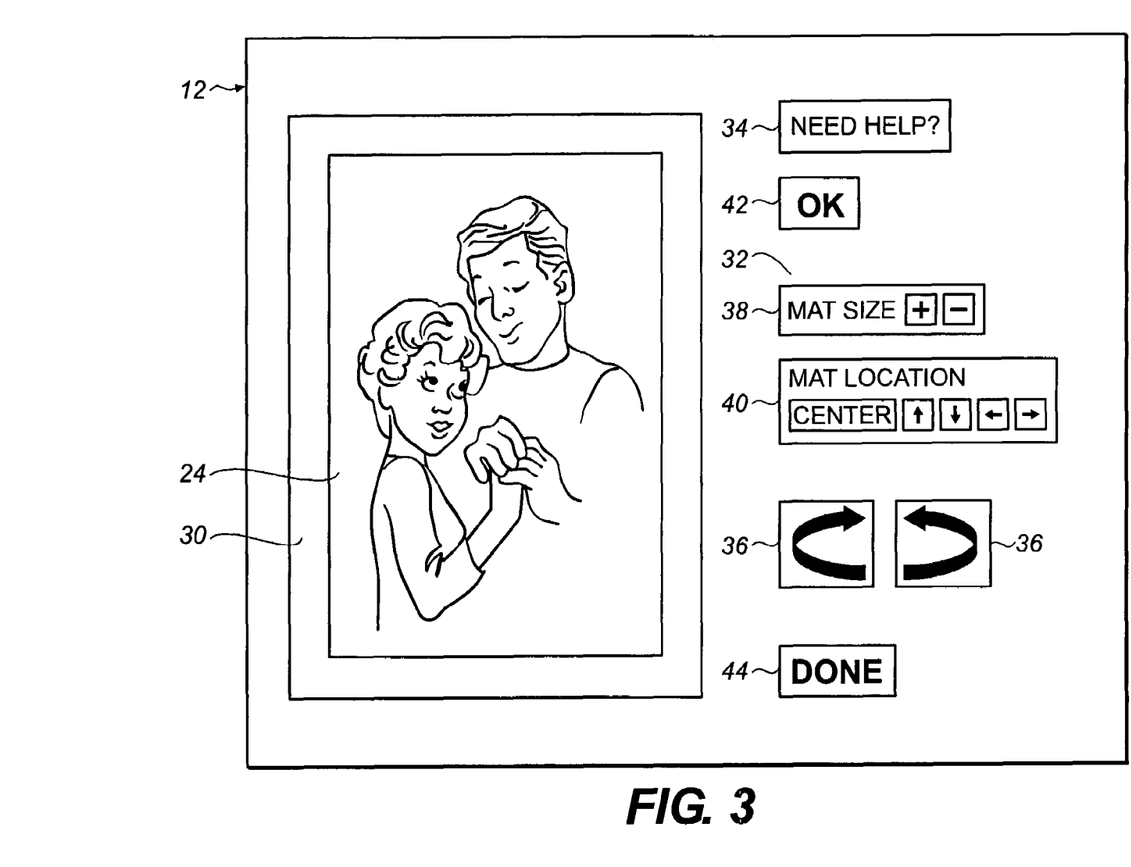
FIG. 3 shows a display of the image producing device displaying an image having a single mat area.

FIG. 3 illustrates user-supplied visual image 24 which is displayed in display 12 of image producing device 10 as a digital image. A mat area 30 borders image 24. Mat area 30 defines a border disposed about image 24 to serve as a frame or contrast for the image. As illustrated in FIG. 3, mat area 30 surrounds the perimeter of image 24.

An instruction area 32 may be provided in display 12. Instruction area 32 may include one or more text and/or touchscreen buttons, instructional members, icons, or indicators for instructing and/or adjusting image 24 or mat area 30. For example, as shown in FIG. 3, a help message 34 might be provided. Further, a rotation indicator 36 may be a provided to rotate image 24 clockwise or counterclockwise to properly orient the image. Further, a user may desire to adjust the size or position of mat area 30 relative to image 24, and accordingly, a size indicator 38 and position indicator 40 may be provided to permit the size and position adjustment. An indicator may be provided to indicate a user's approval or completion of a step, illustrated at 42 and 44, respectively. Another indicator which may be included (but not shown) might be a zoom in/out feature. Additional features known to those skilled in the art may be desired. Alternatively, keyboard 13 could be used if display 12 is not enabled as a touchscreen.

Figure 4:
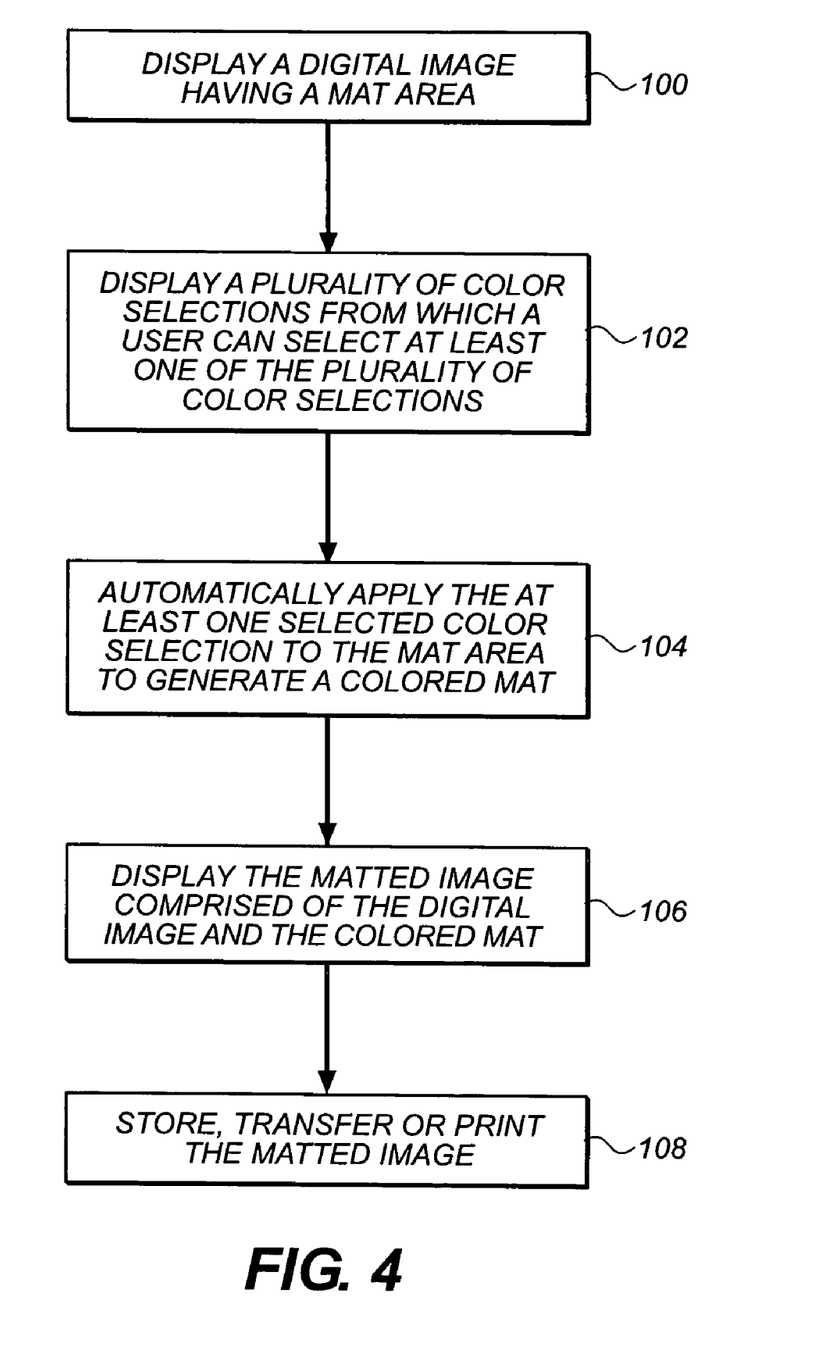
FIG. 4 shows a flow diagram of a method of constructing a matted image in accordance with the present invention.

A diagram illustrating a method in accordance with the present invention is shown in FIG. 4 for producing a matted image which is usable in a scrapbook. At step 100, image 24 (in digital form) and mat area 30 are displayed in display 12. A plurality of color selections from which a user can select at least one of the plurality of color selections is also displayed in display 12 (step 102). The at least one selected color selection is automatically applied to the mat area to generate a colored mat (step 104). The matted image comprised of the digital image and the colored mat are then displayed in display 12 (step 106). The matted image can then, if desired, be stored, transferred, or printed (step 108).

Figure 5:
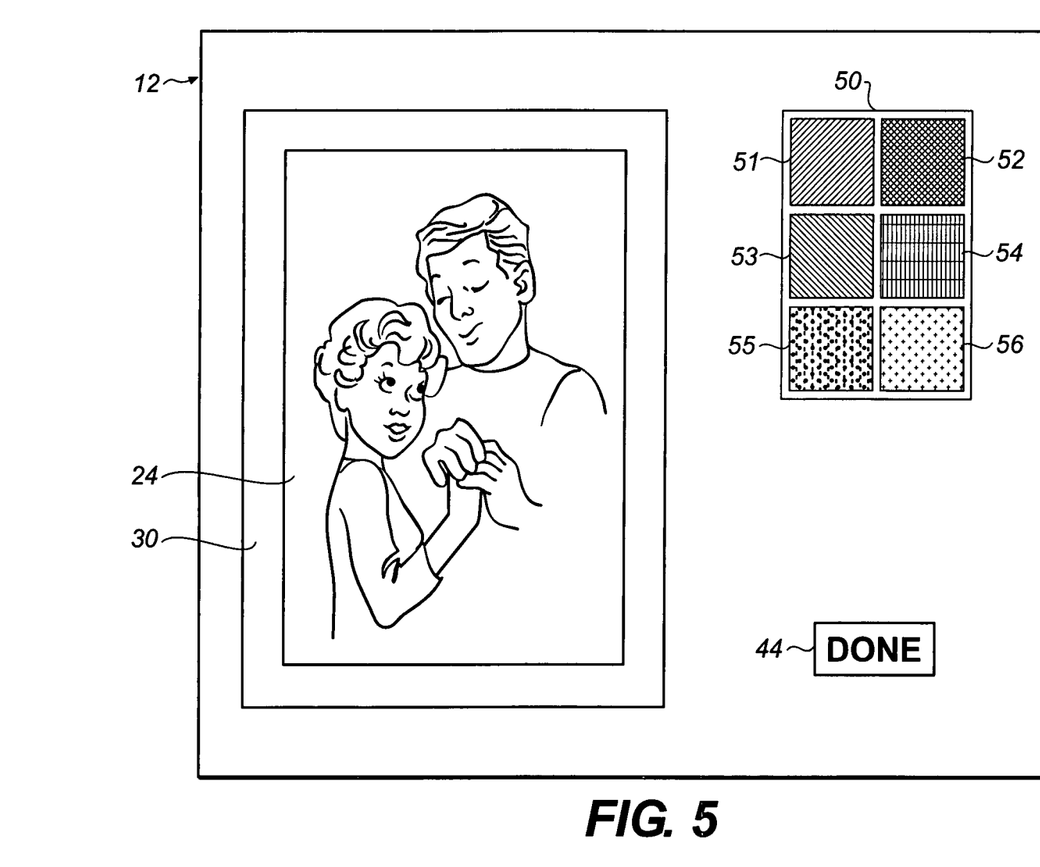
FIG. 5 shows the display of the image producing device displaying a plurality of color selections from which a user can select.
Figure 6:
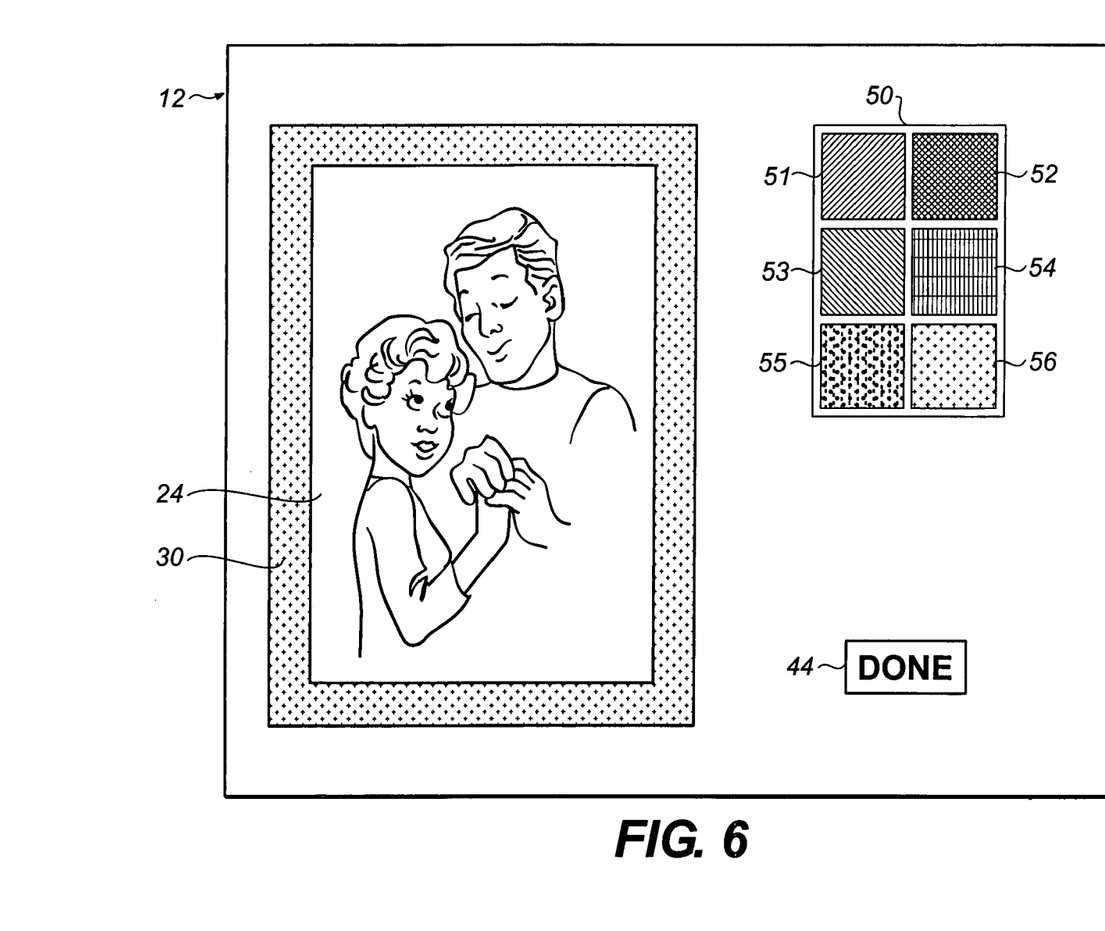
FIG. 6 shows the display of FIG. 5 wherein the user has selected a color to be applied to the matted area to produce a matted image.

FIGS. 5 and 6 illustrates a matted image produced using the method shown in FIG. 4. More particularly, FIG. 5 shows display 12 of image producing device 10 displaying a color selection area 50 comprised of a plurality of color selections 51,52,53,54,55,56 from which a user can select. For purposes of illustration, color selections 51,52,53,54,55, 56 are shown as patterns, and six colors are displayed. If a touchscreen is employed, the user can touch one of the plurality of color selections 51,52,53,54,55,56, and the touched color selection is automatically applied to mat area 30. For example, as shown in FIG. 6, if the user selects color selection 56 having a crossed pattern, and the crossed pattern is automatically applied to mat area 30 to produced a matted image comprised of image 24 and mat area 30. If the resulting matted image is not appealing to the user, the user can select another color from color selection area 50. Accordingly, the user can repeat the process until a desirable mat color is obtained. Then, if desired, the matted image can be stored, transferred, or printed (step 108).

Color selection area 50 is preferably disposed adjacent image 24 and mat area 30 so that the user may readily view the colors which can be selected to apply to mat area 30.

Color selections 51,52,53,54,55,56 may comprise any color, including patterns, or combinations thereof. Since display 12 may be able to display a limited number of colors, an indicator can be provided to allow the user to request a second color area from which to choose a color. The colors to be displayed in color selection area 50 may be selected randomly from a color chart or color wheel, or may be colors typically selected for mats, for example, beige, white, brown, or black.

However, since a scrapbooker is interested in producing an aesthetically pleasing image which focuses on and promotes the subject of the image, the scrapbooker may desire some assistance in selecting a color for mat area 30. Applicants recognize that image 24 may be enhanced if a color displayed in image 24 is used as the color for mat area 30. Accordingly, the present invention determines the colors displayed in image 24 and displays color selection area 50 based on these colors. That is, color selections 51–56 are the color selections of color selection area 50 are colors which are displayed in image 24.

Figure 7:
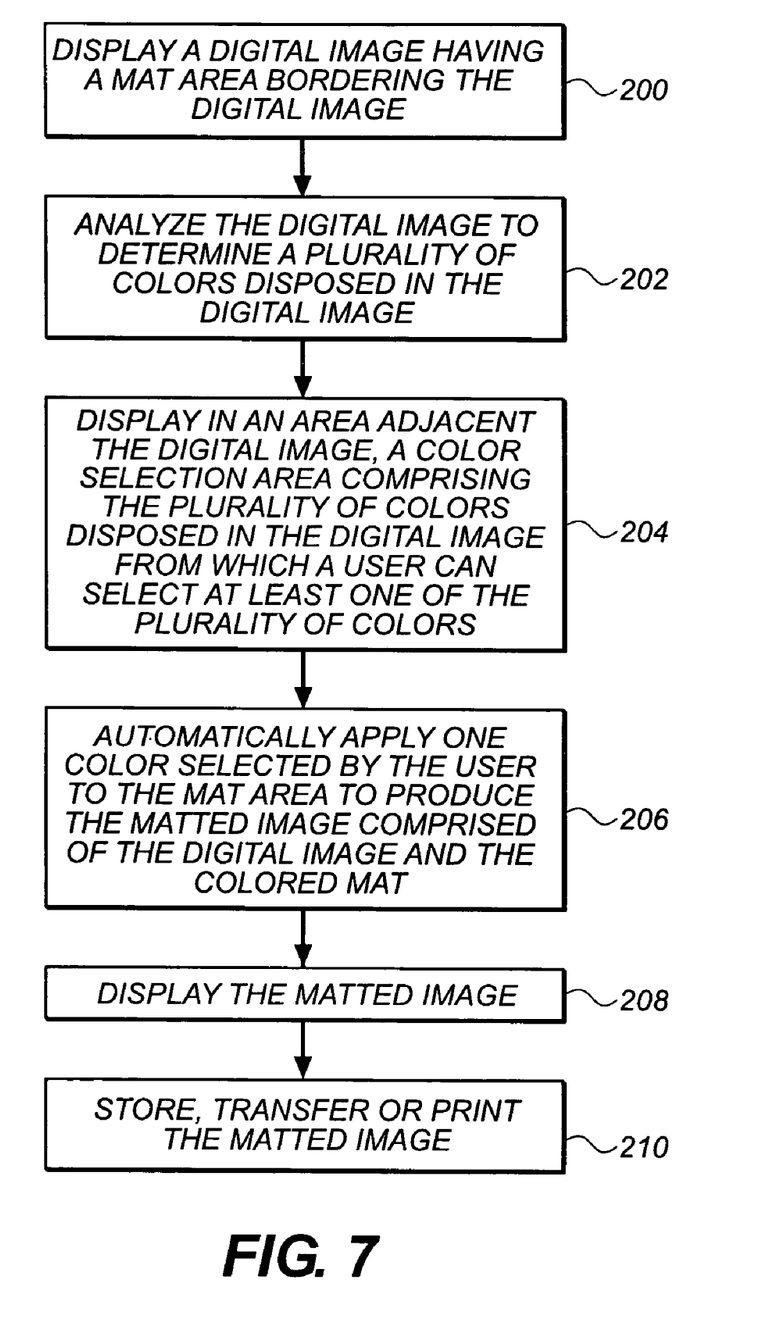
FIG. 7 shows a flow diagram of another method of constructing a matted image in accordance with the present invention.

A diagram illustrating such a method is shown in FIG. 7 for producing a matted image which is usable in a scrapbook.

At step 200, image 24 (in digital form) and mat area 30 are displayed in display 12. Image 24 is analyzed to determine a plurality of colors disposed in image 24 (step 202). The plurality of colored disposed in image 24 are displayed in an area adjacent the digital image in color selection area 50 (step 204) comprising the plurality of colors disposed in image 24 from which a user can select at least one of the plurality of colors. A color selected by the user is automatically applied to mat area 30 to produce a colored mat (step 206). The matted image comprised of the digital image and the colored mat are then displayed in display 12 (step 208). The matted image can then, if desired, be stored, transferred, or printed (step 210).

Figure 8:
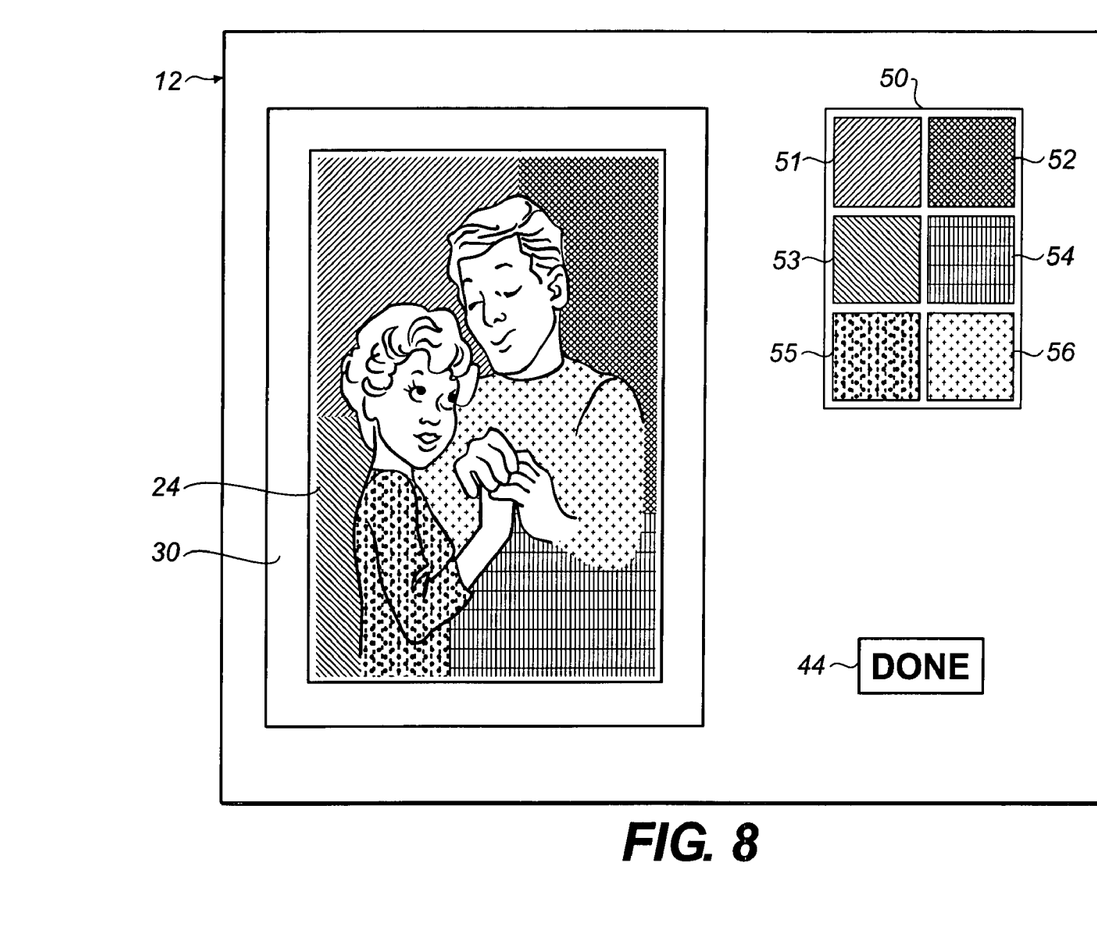
FIG. 8 shows the display of the image producing device displaying a plurality of color selections from which a user can select.
Figure 9:
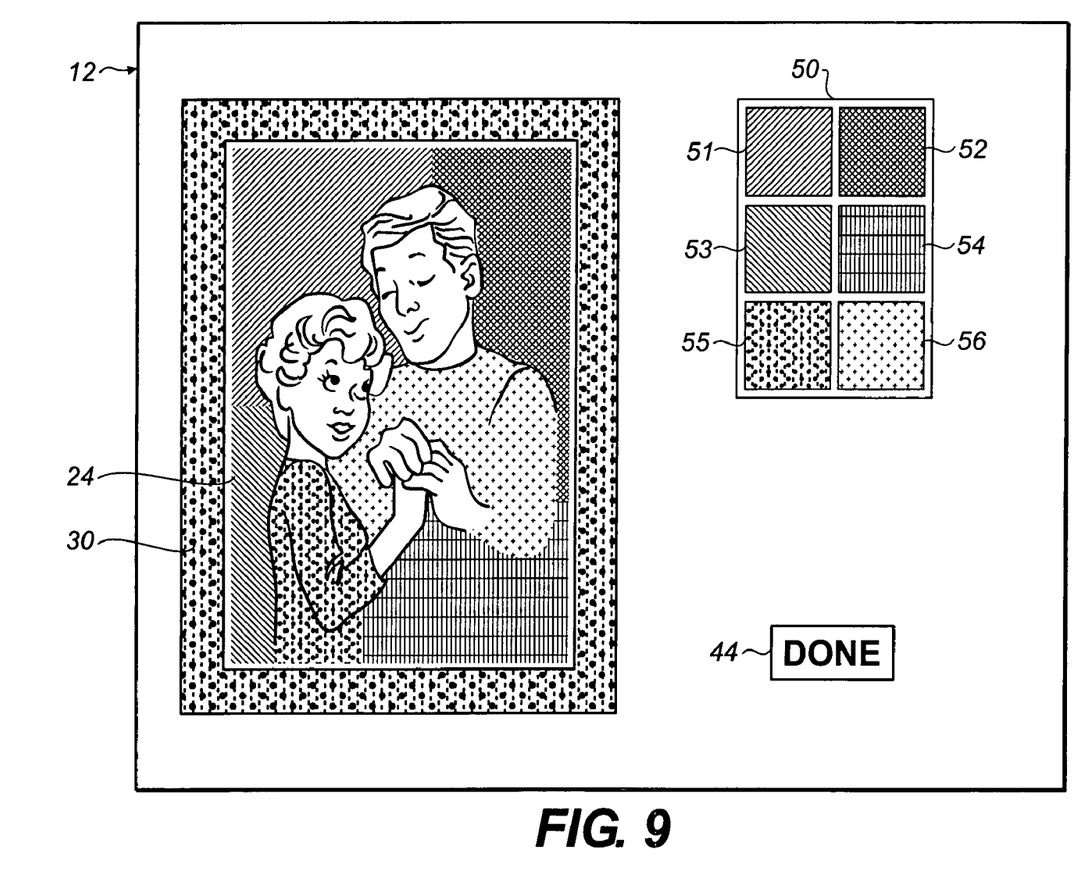
FIG. 9 shows the display of FIG. 8 wherein the user has selected a color to be applied to the matted area to produce a matted image.

FIGS. 8 and 9 illustrates a matted image produced using the method shown in FIG. 7. More particularly, FIG. 8 shows image 24 which has been analyzed to determine the colors disposed in the image. To illustrate the colors of image 24 in FIG. 8, various patterning has been employed. For example, the color of the dress of the woman is illustrated by a dotted pattern while the color of the shirt of the man is illustrated by a crossed pattern. These colors which have been determined to comprise image 24 are displayed in color selection area 50. Accordingly, color selection area 50 comprises a color palette comprising colors found in the image. As illustrated in FIG. 8, color selection area 50 is comprised of color selections 51,52,53,54,55,56, from which a user can select. For purposes of illustration, six colors are displayed. If a touchscreen is employed, the user can touch one of the plurality of color selections 51,52,53, 54,55,56, and the touched color selection is automatically applied to mat area 30. For example, as shown in FIG. 9, if the user selects color selection 55 having a dotted pattern, and the dotted pattern is automatically applied to mat area 30 to produced a matted image comprised of image 24 and mat area 30.

Techniques are known to those skilled in the art for analyzing an image and determining the colors disposed in the image. For example, Adobe Photoshop is an image editing software program which employs an index color routine which would be suitable.

Figure 10:
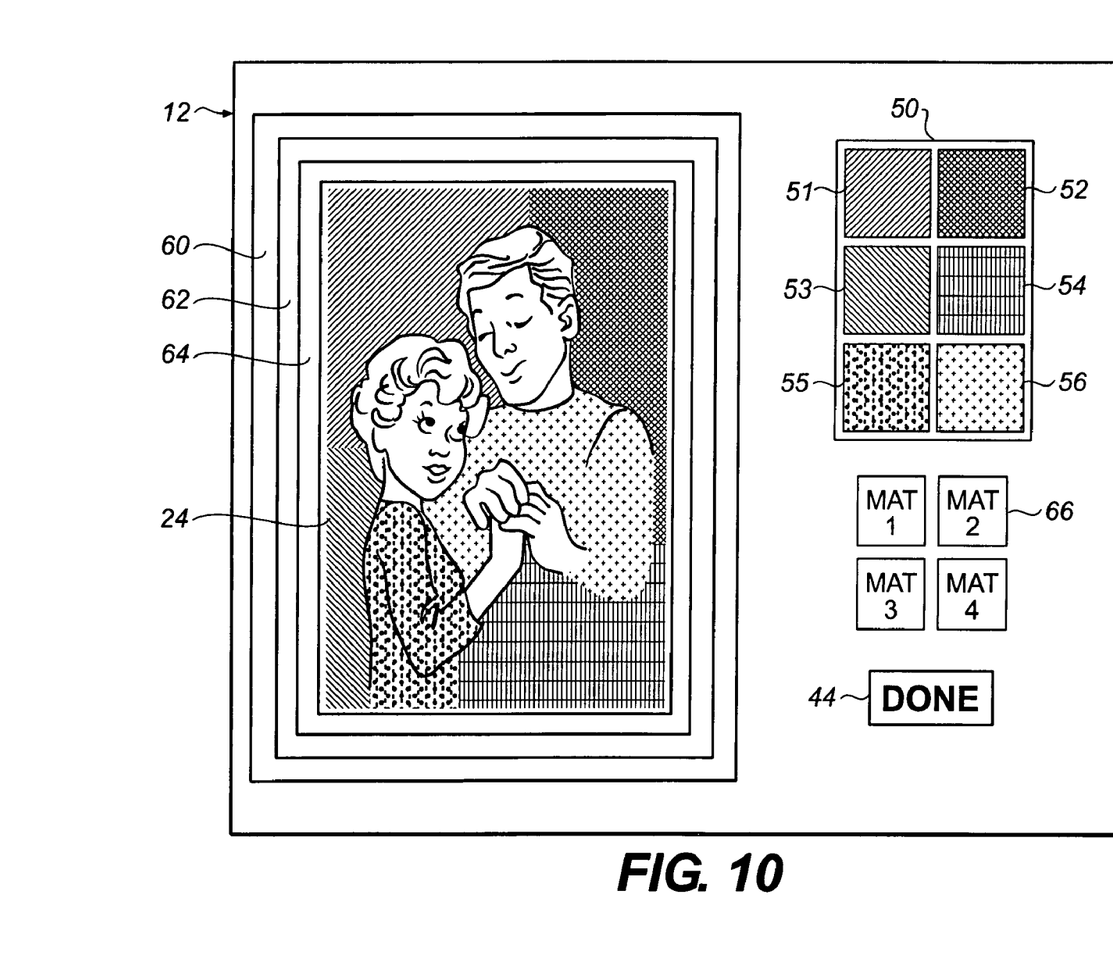
FIG. 10 shows the display of the image producing device having a plurality of mat areas.
Figure 11:
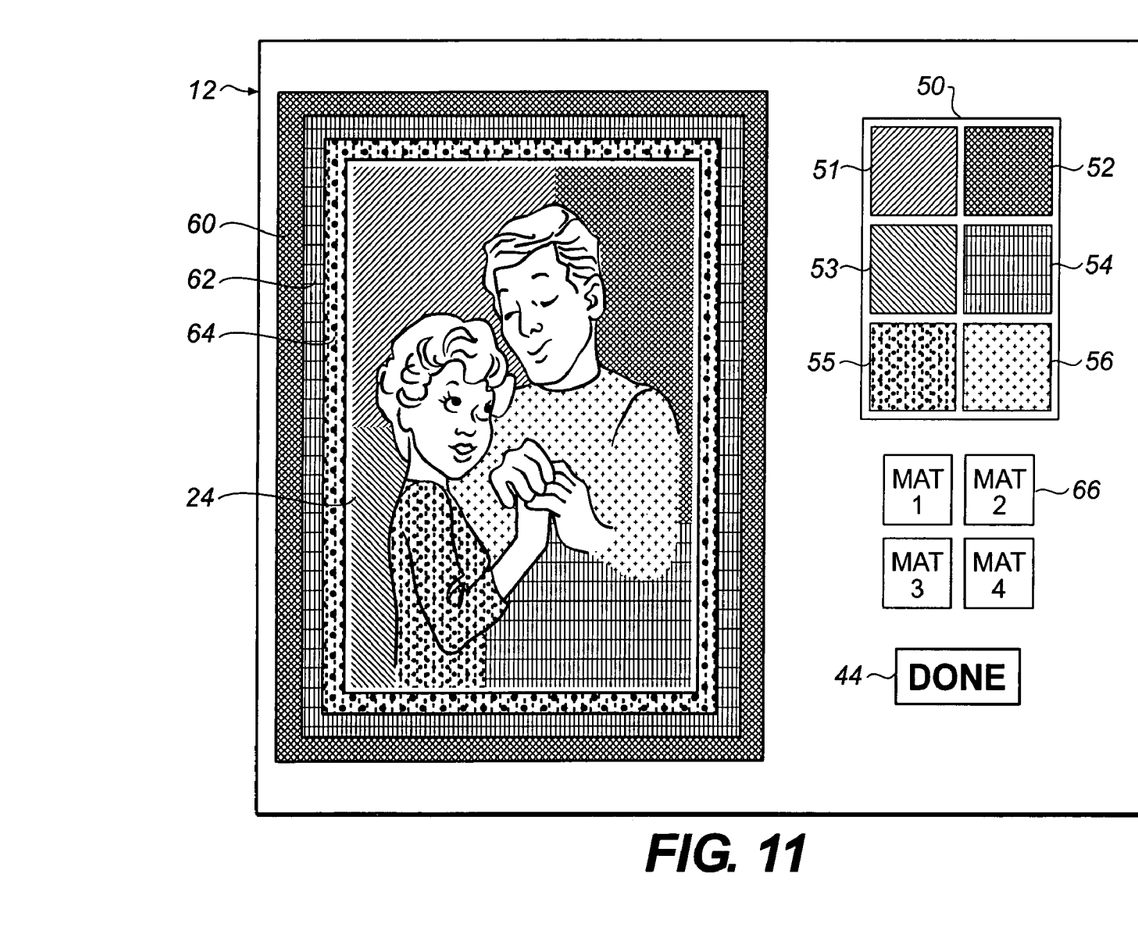
FIG. 11 shows the display of FIG. 10 wherein the user has selected a color to be applied to each of the matted areas to produce a matted image.

To further enhance image 24, a scrapbooker may desire more than one mat area. FIG. 10 illustrates image 24 having a plurality of mat areas 60,62,64 framing image 24, though any number of mat areas may be employed. Instruction area 32 includes a mat selection indicator 66 for selecting a particular mat area. In FIG. 10, mat selection indicator 66 comprises four selection options; mat 1, mat 2, mat 3, and no mat. Once the particular mat area has been selected using mat selection indicator 66, a color selection is made from color selection area 50. Accordingly, for each mat area 60,62,64, one color selection selected by the user is automatically applied to the mat area to produce the matted image comprised of the digital image and the colored mat, and the resulting matted image is displayed. FIG. 11 shows a matted image if color selection 52 is selected for mat area 60, color selection 54 is selected for mat area 62, and color selection 55 is selected for mat area 64.

The matted image printed may be directly inserted into a scrapbook. Alternatively, the matted image can be fixed to a page which can be used in the scrapbook.

To promote the dynamic and simultaneous display of image 24 and mat areas, a low resolution image of image 24 may be generated and displayed in display 12. However, when the scrapbooker desires to store, transmit, or print the matted image, a full resolution image of image 24 and mat areas would be stored, transmitted, or printed.

Figure 12:
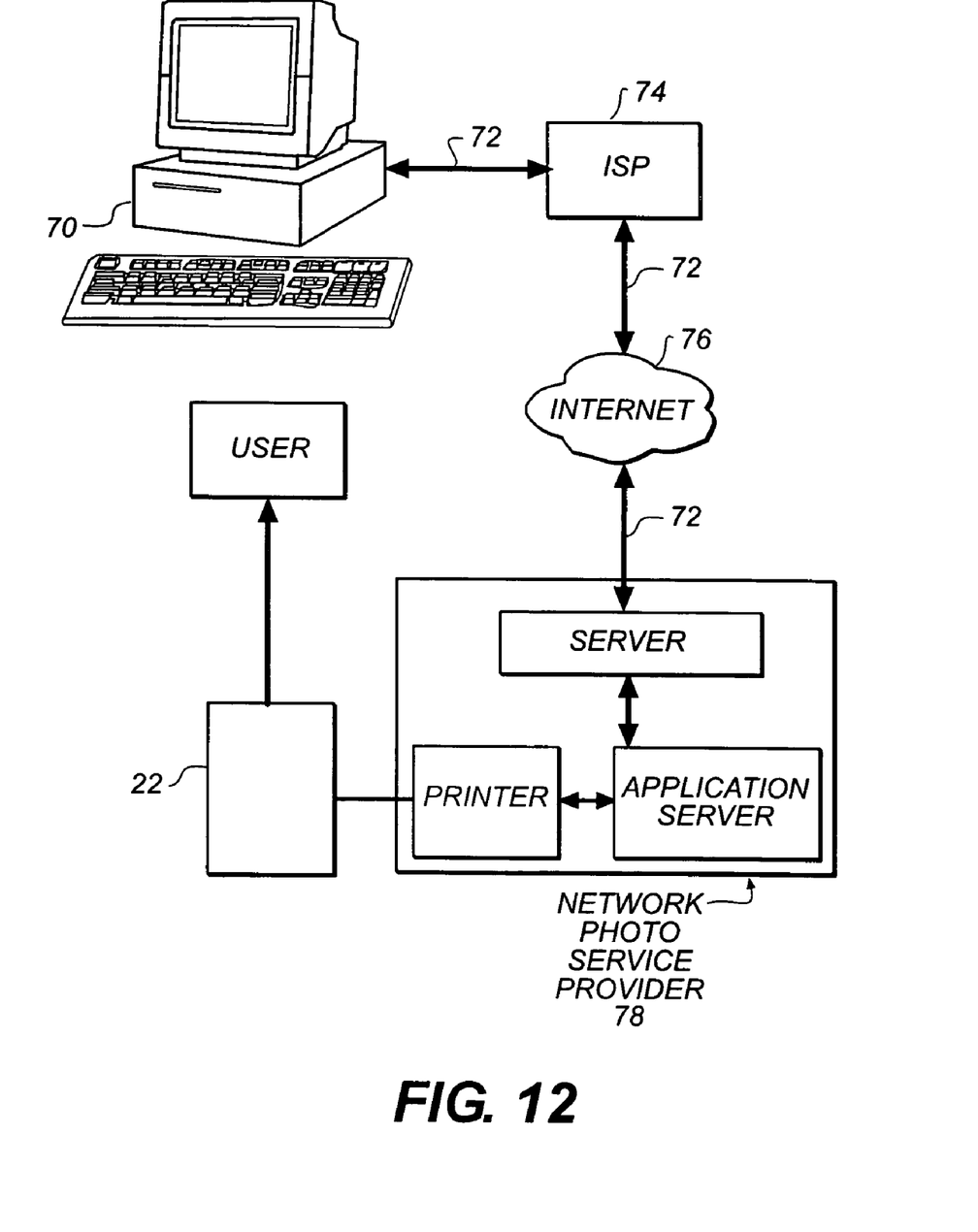
FIG. 12 shows a schematic diagram showing the use of a communications network for communicating with a service provider to construct a matted image in accordance with the present invention.

In an alternate embodiment, the user submits the matted image to a service provider from which the service provider can store, print, or transfer the matted image. Referring to FIG. 12, when employing a service provider, a computer 70, such as a home or personal computer, can be used as image producing device 10 for viewing image 24. The communications channel for transmitting matted image 22 is generally shown in FIG. 12 at 72, with communication being accomplished by means of an internet service provider (ISP) 74 and the internet 76 to a service provider 78. The service provider can provide the user with a scrapbook page including the matted image produced thereon. The scrapbook page can be provided by mail, email, or through a retail store. The scrapbook page provided may be suitable for direct insertion in a scrapbook album, though the scrapbooker may edit the scrapbook page prior to inserting in the scrapbook album. If sent electronically, the user would need access to a printer or other device if the user desires a print of the matted image. Payment to the service provider for the matted image can be made by means of the communication channel.

The format of a typical display 12 is landscape, that is, the width is longer than the height. As previously stated, color selection area is preferably adjacent image 24, therefore one possible layout format is to arrange image 24 and color selection area 50 side by side in display 12, as shown in FIGS. 5–6. If display 12 employs a touchscreen feature, a right handed user will typically use a finger on his/her right hand to select a color from color selection area 50. As such, if color selection area 50 is located to the right of image 24 (as shown in FIGS. 5–6), then the user will have an unobstructed view of image 24 (and mat area 30). If the user uses his/her left handed, then their hand/arm may obstruct their view of image 24 and mat area 30. To overcome this problem, instruction area 32 may include a format selector (not shown) to enable the user to select the layout of color display 12. An example of a possible format selector is a button(s) to select a left or right-handed layout. A right-handed layout places color selection area 50 to the right of image 24. A left-handed layout places color selection area 50 to the left of image 24.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 image producing device
12 display
13 keyboard
14 scanner
15 input port
16 delivery section
18 computer
20 printer
22 matted image
24 user-supplied visual image
26 removable media reader
27 removable media
30 mat area
32 instruction area
34 help message
36 rotation indicator
38 size indicator
40 position indicator
42 approval indicator
44 completion indicator
50 color selection area
51 color selection
52 color selection
53 color selection
54 color selection
55 color selection
56 color selection
60 mat area
62 mat area
64 mat area
66 mat selection indicator
70 computer
72 communications channel
74 ISP
76 Internet
78 service provider
100 step
102 step
104 step
106 step
108 step
200 step
202 step
204 step
206 step
208 step
210 step

What is claimed is:

1. A method of producing a matted image which is usable in a scrapbook, comprising the steps of:
   (a) displaying a digital image having a mat area;
   (b) analyzing the digital image to determine a plurality of colors disposed in said image;
   (c) displaying at least one of the plurality of colors of the analyzed image in a color selection area from which a user can select at least one of the plurality of colors;
   (d) automatically applying at least one selected color from the color selection area to the mat area to generate a colored mat; and
   (e) displaying the matted image comprised of the digital image and the colored mat.

2. The method of claim 1, further comprising the step of storing, transferring, or printing the matted image.

3. The method of claim 1, wherein the matted image comprises a plurality of mat areas, and repeating steps (d) through (e) for each mat area.

4. The method of claim 1, further comprising the step of displaying a second plurality of colors from which a user can select.

5. The method of claim 1, further comprising the step of fixing the matted image to a page which can be used in the scrapbook.

6. The method of claim 1, further comprising the step of adjusting the size or position of the mat area relative to the digital image.

7. A matted image which is usable in a scrapbook produced by the method of claim 1.

8. A computer storage product having at least one computer storage medium having instructions stored therein causing one or more computers to perform the method of claim 1.

9. A method of producing a matted image which is usable in a scrapbook, comprising the steps of:
   (a) displaying a digital image having a mat area bordering the digital image;
   (b) analyzing said digital image to determine a plurality of colors disposed in the digital image;
   (c) displaying on a display in an area adjacent the digital image, a color selection area comprised of the plurality of colors of the analyzed image from which a user can select at least one of the plurality of colors;
   (d) automatically applying one color selected by the user to the mat area to produce the matted image comprised of the digital image and the colored mat; and
   (e) displaying the matted image.

10. The method of claim 9, further comprising the step of storing, transferring, or printing the matted image.

11. The method of claim 9, wherein the matted image comprises a plurality of mat areas, and repeating steps (d) through (e) for each mat area.

12. The method of claim 9, further comprising the step of displaying a second plurality of colors from which a user can select.

13. The method of claim 9, further comprising the step of fixing the matted image to a page which can be used in the scrapbook.

14. The method of claim 9, further comprising the step of adjusting the size or position of the mat area relative to the digital image.

15. A matted image which is usable in a scrapbook produced by the method of claim 9.

16. A method of producing a matted image which is usable in a scrapbook, comprising the steps of:
   displaying a digital image having a mat area bordering the digital image;
   analyzing the digital image to determine a plurality of colors disposed in the digital image;
   displaying in an area adjacent the digital image, a color selection area comprising the plurality of colors disposed in the digital image from which a user can select at least one of the plurality of colors;
   automatically applying one color selected by the user to the mat area to produce the matted image comprised of the digital image and the colored mat;
   displaying the matted image; and
   storing, transferring, or printing the matted image.

17. A matted image which is usable in a scrapbook produced by the method of claim 16.

* * * * *